United States Patent [19]

Bocard et al.

[11] 4,169,052

[45] Sep. 25, 1979

[54] PROCESS FOR ABSORBING HYDROCARBONS OR ORGANIC SOLVENTS

[75] Inventors: Christian Bocard, Orgeval; Marc Folachier, Sainte-Foy-les-Lyon, both of France

[73] Assignee: Institut Francais du Petrole, Rueil-Malmaison, France

[21] Appl. No.: 885,224

[22] Filed: Mar. 10, 1978

[30] Foreign Application Priority Data

Mar. 11, 1977 [FR] France .............................. 77 97580

[51] Int. Cl.² .............................................. C02B 9/02
[52] U.S. Cl. .......................................... 210/27; 134/7; 210/36; 210/40; 210/73 W; 210/DIG. 26
[58] Field of Search ................... 8/94.25, 94.27, 94.29, 8/94.32, 94.33; 134/6, 7; 210/30 A, 36, 40, 73 W, 242 AS, DIG. 26, 27

[56] References Cited

U.S. PATENT DOCUMENTS

| 3,536,615 | 10/1970 | Bunn | 210/DIG. 26 |
| 3,657,125 | 4/1972 | Strickman | 210/40 |
| 3,901,929 | 8/1975 | Cote | 8/94.27 |
| 3,960,722 | 6/1976 | Tomikawa et al. | 210/36 |

*Primary Examiner*—Charles N. Hart
*Assistant Examiner*—Ivars Cintins
*Attorney, Agent, or Firm*—Millen & White

[57] ABSTRACT

Surfaces and media contaminated with fatty materials such as hydrocarbons, vegetable or animal oils or fats, organic solvents and other organic compounds may be cleaned by spreading thereon leather particles and/or fibers. A preferred embodiment comprises bringing leather wastes to a selected water content and crushing them to particles and/or fibers.

14 Claims, No Drawings

PROCESS FOR ABSORBING HYDROCARBONS OR ORGANIC SOLVENTS

The invention concerns a process for cleaning surfaces and media contaminated with fatty materials such as hydrocarbons, vegetable or animal oils, organic solvents and various organic compounds. The invention also concerns a new absorption material which can be used to absorb said materials.

A first application concerns the purification of oily aqueous effluent streams containing suspended or emulsified hydrocarbons, oils or fats. The emulsions of the said compounds, which can be treated according to the invention are mechanical emulsions, i.e. formed by mere stirring, or chemical emulsions, i.e. stabilized by surfactants.

The oil industry discharges hydrocarbon containing aqueous effluents which must be purified before re-use or rejection to the natural media. Examples of sewage which can be purified according to the invention are oil field waters, tanker wash waters, refinery waters and tank waters.

Another type of oily aqueous effluent which can be purified according to the present invention consists of the discharge of cutting oils employed in the mechanical industry for the diverse operations of metal cutting and machining. This discharge comprises oil emulsions, containing from about 0.1 to 20% of oil, stabilized with various surfactive agents in variable proportions.

Other industries and industrial activities discharge sewage containing suspended vegetable or animal oils and fats, for example, particular sectors of the food industry and the fat industry (tallow, lard and the like).

A number of techniques has been designed to purify aqueous effluents containing emulsified hydrocarbons or oils. It is thus possible to operate by coagulation/flocculation with inorganic salts; however this technique is not very efficient for eliminating finely emulsified hydrocarbons and oils and also yields partially incombustible muds of high water content. The use of synthetic organic polymers gives better results but at a relatively high cost. The adsorption on active carbon is an efficient technique, but, due to its cost its applicability is limited to difficult cases or to finishing treatments.

The object of the invention is to employ inexpensive absorption materials consisting of industry wastes which can be thermally destroyed after use as purification agents.

According to a first embodiment, the invention may concern effluent streams containing hydrocarbons, oils or fats in any amount; it is however more desirable to apply it to wastes which have been subjected to a primary de-oiling to seperate by gravity easily settled hydrocarbons or other organic materials.

According to another embodiment, the invention concerns the cleaning of water surfaces accidentally polluted with hydrocarbons, oils or various water-immiscible organic solvents whose density is lower than 1.

The industrial or domestic use of petroleum hydrocarbons may result in the discharge, to the ground or the waters, of such products in the form of, for example, fuels, combustibles or lubricating oils, as a result of accidents of various origins or as a result of an industrial activity.

A third application of the invention concerns the protection and cleaning of the ground when polluted by accident or permanently by hydrocarbons, oils or various organic compounds, eventually in admixture with water.

The accidental spreading of hydrocarbons (motor fuels, heating oils, mineral oils) on the ground or water surfaces may result from the transportation of these products and their industrial or individual use.

Activities in the mechanical industry may result in the permanent spreading of oils (lubricating oils, cutting oils) on the ground of works which are thus to be cleaned.

In the same way industrial activities, such as the fat industry (oil and margarine factories), the co-operative dairyworks, the canning industry, the industrial butcher and porkbutcher trade, the fish industry, the manufacture of flour food, and the slaughter houses and knacker's yards, result in the accidental or permanent spreading on the ground of vegetable or animal oils or fats and various products such as serum, blood, etc...

The transport of solvents and various organic materials may also result in accidental spreading over roads, various types of grounds, water surfaces, etc...

A technique for protecting and cleaning grounds and waters polluted (or liable to be polluted) with hydrocarbons, oils, fats or various organic products consists of using adsorbent materials for said products, which materials are spread over the surface to be protected or cleaned.

It has been found that useful absorption materials for the applications disclosed in the present invention are products from the leather industry, and it is advantageous, on the economic point of view, to employ waste materials produced when transforming animal skins.

Among the skins and skin constituents in their various states, as result from the conversion of the raw skin to finished leather, it is advantageous to use tanned leather wastes. Tanned leather is the material resulting from tanning the so-called lime hide by means of tannin or other tanning materials; the tanning operation being defined as converting lime hide, a material which has a high water content, is highly putrescible, very sensitive to hot water, hard and translucent when dry, to leather, a material of low water content, imputrescible, more resistant to hot water, opaque, pliable or plastic when dry.

The tannins or tanning materials to be used for obtaining leather whose wastes are used according to the present invention may be of any type, particularly vegetable tannins, inorganic materials or organic materials which are not of vegetable origin.

The vegetable tannins are obtained, for example, from certain barks, woods, leaves, fruits or roots.

Among the minerals to be used for tanning, the following are concerned: chromium salts, aluminum salts, iron salts, zirconium salts or sulfur.

Examples of organic products which are not of vegetable origin are: formaldehyde, benzoquinone, synthetic tannins or oils from sea animals.

As indicated, there is used in the present invention particles of leather, as recovered from the working of the skins in any manner. These wastes have usually various shapes: various surfaces, strips, cuttings. To absorb the hydrocarbons, oils, fats and various organic materials, according to the applications disclosed in the invention, there is usefully employed the wastes in the form of fibers or particles of a size lower than 1 centimeter, and preferably wastes obtained by optional drying and crushing of the crude wastes according to a process designed to maximize the absorption properties of these materials and which will be described below.

Two types of starting materials for producing fibers or particles are to be particularly mentioned, the optimal results being obtained with the material of the first type:

1. The "wet-blue" wastes resulting from making regular the thickness of leather obtained by chromium salt tanning, said operation being effected by splitting or shaving (these operations are performed with belt saws and blade rolls). These wastes appear either as thin leather sheets without mechanical properties, discontinued and irregular, or as cuttings. They contain 45-70% water and have a low fat content (usually less than 1%).

2. The wastes of finished leather or crust leather resulting from sampling operations (cutting of strips at the periphery of leather to improve the appearance) and from cutting in the utilization industries (shoes, fancy-leather goods, gloves, dresses, furniture, etc...) They have rather constant water contents, about 12-14%. Their composition is quite unsettled, depending on their previous treatments; they comprise, among others, tanning substances, fillings, dyes and mainly fats or oils of animal or synthetic origin in quite variable proportions, from 3 to 25%.

It has been found advantageous, as concerns the applications described in the present invention, to use fibers or particles whose water content is from 15 to 25%, preferably 15 to 20% by weight. The best results are obtained when the crushing is applied to leather previously brought to this water content by drying or re-wetting.

The use of leather having lost all its absorption properties, following waterproofing, coating or other operation, is excluded from the invention.

As concerns the first type of wastes (wet-blue), the drying must be effected under mild conditions, so as to release water progressively, without any shortening or sticking of the fibers which would result to irreversible damage of the structure.

As concerns the second type of wastes (finished leather), the conditioning is effected by water or steam absorption. For forming particles or fibers from the two types of wastes, the crushing is preferably effected in blade crushers fit with a standardized grid to define the grain size and the residence time of the material in the crushing chamber, the latter being optionally selected by choosing the intensity of the pneumatic particles extraction. The residence time in the crusher must be sufficient to so modify the internal structure of the products that the absorption properties are optimal.

The material thus obtained usually appears as a mixture of particles and fibers whose respective proportions depend on the treatment time. The crushing time is preferably so selected as to yield a mixture of fibers and particles comprising 10-30% by weight of fibers, such a mixture having particularly remarkable absorption properties.

It has been observed that the presence of fibers in these mixtures is advantageous for the absorption of hydrocarbons, oils, fats, and various products, particularly when spread over surfaces having small windings.

When only fibers are desired, the mixture of particles and fibers may be further treated in a percussion crusher.

The material in the form of fibers has a higher absorption rate than in the form of particles; however, in certain cases, it is more easily handled and utilized in the form of particles.

There is usefully employed in the present invention particles and fibers whose greater dimension is lower than 1 cm.

A preferred composition comprises 10-100% of fibers and 0-90% of particles by weight.

According to the first embodiment, as above indicated, i.e. purification of oily aqueous effluents, the invention may be practiced by using a contact apparatus fit with a mechanical stirrer to maintain the leather particles or fibers suspended in the effluent to be purified. The effluent to be purified may also be percolated through a bed of leather particles or fibers maintained in a column.

According to the second and the third embodiments, the material may be used by spreading, either in bulk or contained in bags of various nature and shape, such as pillows, slubs, etc... ensuring passage of the material to be absorbed; the latter embodiment ensures an easier recovery of the impregnated material.

As concerns the third embodiment, i.e. the use for cleaning the ground, it has been found that certain properties could be improved by admixing leather particles and fibers with a water insoluble powdered mineral additive. It has been found in particular that the non-skid properties of the material can be improved by admixing it intimately with a water insoluble mineral powder. Examples of mineral powders which can be used are: natural or precipitated calcium carbonate, kaolinite, bentonite, montmorillonite, talc and, as a rule, all natural silicates. Calcium carbonate is preferred. The mineral powder is admixed with the leather particles or fibers in a proportion of 1-30% by weight of mineral powder to leather, preferably 5-15%.

The following non-limitative examples illustrate the invention:

EXAMPLE 1

1 Kg of gas oil has been spread over a concrete surface. It is cleaned by spreading on the plash "wet-blue" leather particles of size lower than 5 mm and comprising 15% by weight of fibers, prepared by crushing "wet-blue" leather wastes previously brought by drying to a water content of 18% by weight.

The complete absorption of 1 liter gas oil requires 330 g of this material, corresponding to an absorption capacity of 300% by weight.

EXAMPLE 2

The same cleaning operation as in example 1 is effected with particles of the same size prepared by crushing identical "wet-blue" leather wastes, although not dried before crushing (water content: 60% by weight).

1080 g of this material are necessary to absorb 1 Kg of gas oil, which corresponds to an absorption capacity of only 92% by weight.

When the same wastes (water content: 60% by weight) are first crushed and then dried up to a water content of 18% by weight, there is obtained a material whose absorption capacity in the same conditions is only 150% by weight.

This shows the better results obtained with the treatment according to example 1.

EXAMPLE 3

The same cleaning operation as in example 1 is effected by using particles of the same grain size, prepared by crushing chromium tanned crust leather wastes. The material which contains 12% water and 16% fat has an absorption capacity of 123% by weight.

EXAMPLE 4

The same cleaning operation as in example 1 is effected by using leather particles of the same particle size, prepared according to the same crushing technique, however starting from crust leather wastes tanned with a vegetable tannin and previously moistened to enhance their water content from 13 to 18% by weight.

The material, which contains 18% water and 8% fat, has an absorption capacity of 195% by weight, lower than in example 1.

EXAMPLE 5

The same cleaning operation as in example 1 is effected by using fibers resulting from the thorough crushing of the particles described in said example. The absorption capacity in that case is 660% by weight.

EXAMPLE 6

An identical material as in example 1 is used to absorb various materials spread on a concrete surface.

The following absorption capacities have been found for these materials:

| | |
|---|---|
| 20 W 50 Motor oil | 480% by weight |
| Vegetable (pea-nut) oil | 415% by weight |
| Ethyl alcohol | 310% by weight |
| Acetic acid | 410% by weight |
| Methyl ethyl ketone | 205% by weight |
| Acrylonitrile | 225% by weight |

EXAMPLE 7

1 liter of a fine emulsion of gas oil in water, containing 355 mg hydrocarbons, is stirred for 1 hour with 200 mg of leather particles identical to those employed in example 1. After filtration, the residual hydrocarbons are titrated by extraction with carbon tetrachloride and infra-red spectrometry. Their amount is 93 mg, thus corresponding to an absorption of 131% with respect to the dry particles.

EXAMPLE 8

1 liter of used cutting oil from machining works and containing 15% oil is treated. After adjustment of the pH to 2, the emulsion is stirred for 30 minutes with 15 g of leather wastes identical to those treated in example 1. After filtration, the absorbed oil is extracted and it is found that 90 g of oil have been eliminated from the emulsion.

EXAMPLE 9

Particles identical to those of example 1 are spread over 2 liters of crude oil (d=0.890) floating on water contained in a pool. After complete absorption of the crude oil, the saturated material is collected by means of a metal grid. 560 g pf particles have been utilized, which corresponds to an absorption capacity of 320% by weight.

What we claim is:

1. A process for cleaning media or surfaces comprising oil or fat materials by absorption of said materials with an absorption mass, wherein the absorption mass comprises absorptive leather particles or fibers of size lower than 1 cm, as obtained from tanning animal skin and subsequently crushing the tanned skin, said leather particles having leather surfaces thereof in direct contact with said oil or fat materials during absorption.

2. A process according to claim 1, wherein the tanning agent is a vegetable tannin, an inorganic material selected from sulfur and chromium, aluminum, iron or zirconium salts, or an organic tanning material of a non-vegetable origin.

3. A process according to claim 2, wherein the tanning agent is a chromium salt.

4. A process according to claim 1, wherein the particles or fibers are obtained by drying wet-blue leather wastes under mild conditions to 15–25% by weight water content prior to crushing same.

5. A process according to claim 4, wherein the absorption mass is a mixture of particles and fibers, whose fiber content is 10–30% by weight.

6. A process according to claim 1, wherein the particles or fibers are obtained by crushing tanned leather wastes previously brought to a water content of 15–25% by weight.

7. A process according to claim 6, wherein the water content is 15–20% by weight.

8. A process according to claim 1, wherein the absorption mass is a mixture of particles and fibers, whose fiber content is 10–30% by weight.

9. A process according to claim 1, wherein the absorption mass is a mixture of 70–99% by weight leather particles or fibers with a 1–30% by weight of water insoluble mineral powder.

10. A process according to claim 9, wherein the medium or surface to be cleaned is the ground, and the water-soluble mineral powder is calcium carbonate.

11. A process according to claim 9 containing 5–15% by weight of said mineral powder.

12. A process according to claim 1, wherein the medium or surface to be cleaned is a water surface.

13. A process according to claim 1, wherein the medium or surface to be cleaned is an aqueous emulsion discharge stream.

14. A process according to claim 13 wherein the aqueous emulsion discharge stream has been subjected to a preceding primary de-oiling step.

* * * * *